US008518465B2

(12) United States Patent
Nakano et al.

(10) Patent No.: US 8,518,465 B2
(45) Date of Patent: Aug. 27, 2013

(54) ACID MILK BEVERAGE AND PROCESS FOR PRODUCING THE SAME

(75) Inventors: Masatoshi Nakano, Minato-ku (JP); Akihisa Matsui, Minato-ku (JP); Yukiko Kobayashi, Minato-ku (JP); Ryoichi Akahoshi, Minato-ku (JP)

(73) Assignee: Kabushiki Kaisha Yakult Honsha, Tokyo (JP)

( * ) Notice: Subject to any disclaimer, the term of this patent is extended or adjusted under 35 U.S.C. 154(b) by 968 days.

(21) Appl. No.: 12/093,388

(22) PCT Filed: Oct. 20, 2006

(86) PCT No.: PCT/JP2006/320897
§ 371 (c)(1),
(2), (4) Date: May 12, 2008

(87) PCT Pub. No.: WO2007/055089
PCT Pub. Date: May 18, 2007

(65) Prior Publication Data
US 2009/0226566 A1   Sep. 10, 2009

(30) Foreign Application Priority Data
Nov. 11, 2005   (JP) ................................. 2005-326977

(51) Int. Cl.
*A23L 1/304* (2006.01)
(52) U.S. Cl.
USPC ................. 426/74; 426/34; 426/43; 426/573; 426/580; 426/658
(58) Field of Classification Search
USPC .................. 426/580, 658, 34, 573, 74, 43
See application file for complete search history.

(56) References Cited

U.S. PATENT DOCUMENTS

| 4,859,488 A * | 8/1989 | Kan et al. ..................... 426/658 |
| 2003/0175398 A1 | 9/2003 | Ogasawara et al. |
| 2004/0121042 A1 | 6/2004 | Kudo et al. |
| 2004/0213882 A1 * | 10/2004 | Lauridsen ..................... 426/548 |
| 2005/0121042 A1 | 6/2005 | Belhe et al. |
| 2005/0214426 A1 * | 9/2005 | Saelzer ........................ 426/548 |

FOREIGN PATENT DOCUMENTS

| JP | 59 151837 | 8/1984 |
| JP | 5 43 | 1/1993 |
| JP | 5 276864 | 10/1993 |
| JP | 9 266779 | 10/1997 |
| JP | 10-4876 | 1/1998 |
| JP | 2000 279142 | 10/2000 |
| JP | 2002 204656 | 7/2002 |
| JP | 2004 283182 | 10/2004 |
| SG | 127416 | 12/2006 |
| WO | 2005 115157 | 12/2005 |

OTHER PUBLICATIONS

Office Action issued Mar. 15, 2011, in Japan Patent Application No. 2007-544080 (with English translation).
P. R. Murray, "Polydextrose", Low-Calorie Products, (Elsevier Applied Science), 1988, pp. 83-100.
Neil A. King, et al., "Evaluation of the independent and combined effects of xylitol and polydextrose consumed as a snack on hunger and energy intake over 10d", British Journal of Nutrition, vol. 93, XP-002507372, Jun. 15, 2005, pp. 911-9115.
Shida, K. et al., "Nanshokasei Toshitsu O Fukumu Bifidobacterium Hakkonyu No Kajo Yoryo Sesshu Ni Okeru Anzensei Ni Tsuite No Kento" Journal of Japanese Council for Advanced Food Ingredients Research, vol. 2, No. 1, pp. 23-27, 1999.

* cited by examiner

*Primary Examiner* — Helen F Heggestad
(74) *Attorney, Agent, or Firm* — Oblon, Spivak, McClelland, Maier & Neustadt, L.L.P.

(57) ABSTRACT

An acid milk beverage that without the use of conventionally employed various thickening stabilizers, excels in product quality stability, and that realizes good flavor and calorie suppression, being of light type; and a process for producing the same. There is provided an acid milk beverage characterized in that there are contained polydextrose and at least one glucide selected from the group (a) consisting of glucose, fructose, sugar, trehalose, maltose, erythritol, sorbitol, xylitol, maltitol, lactitol, palatinose and galactooligosaccharide, and that the sum of these soluble solid contents is in the range of 12.0 to 17.0 mass %, containing substantially none of thickening stabilizers. Further, there is provided a process for producing the acid milk beverage.

23 Claims, No Drawings

ACID MILK BEVERAGE AND PROCESS FOR PRODUCING THE SAME

TECHNICAL FIELD

The invention relates to an acid milk beverage having an excellent product quality stability and a good taste resulting in neither aggregation nor precipitation of milk protein and, more particularly, it relates to an acid milk beverage in which deterioration of quality specific to an acid milk beverage such as aggregation and precipitation of milk protein is prevented and a good taste is obtainable even without the substantial use of thickening stabilizers.

BACKGROUND ART

Acid milk beverages of a type containing living microbes such as fermented milk, lactic acid bacteria beverage and yogurt have been widely drunk as healthy beverages having physiological activities such as an effect of calming intestinal disorders and an immunopotentiating action. Further, since a culture liquid (a fermented milk base) prepared by incubation of lactic acid bacteria or microbes belonging to genus *Bifidobacterium* in a medium comprising a milk material has a specific taste, it has been utilized in various kinds of foods and beverages for the purpose of imparting flavor, etc. following a sterilizing treatment, etc.

Furthermore, in order to cope with the recent diversifying preferences of consumers, various types of acid milk beverages have been proposed in addition to the conventional acid milk beverages and, among them, development of an acid milk beverage of the so-called light type in which calorie is suppressed has been briskly carried out. Usually, such an acid milk beverage of a light type is produced in such a manner that, for suppressing the calories, glucides which are main calorie source are decreased or substituted with hardly-digesting glucides. However, dispersibility of milk protein usually becomes unstable under an acid condition and, therefore, there are problems that precipitation and aggregation upon storage, separation of whey, etc. are apt to occur when glucides are decreased or modified.

The above-mentioned precipitation, aggregation or whey separation not only deteriorate the appearance significantly but also affect the flavor upon drinking and further deteriorate the refreshing feel and, therefore, various methods have been proposed to improve these problems. To be more specific, there have been proposals for a method where a homogenizing treatment is applied with a purpose of improving the product quality stability of an acid milk beverage (Patent Document 1) and a method where one of thickening stabilizers such as pectin, carboxymethyl cellulose (CMC), soybean polysaccharide, gellan gum, locust bean gum, tamarind gum or propylene glycol alginate or two or more thereof is/are used together (Patent Documents 2 to 4).

As such, it is the current status that, in the production of acid milk beverage of a light type, various kinds of thickening stabilizers are commonly used.

Patent Document 1: JP-A-05-000043
Patent Document 2: JP-A-54-525754
Patent Document 3: JP-A-59-151837
Patent Document 4: JP-A-09-266779

DISCLOSURE OF THE INVENTION

Problems that the Invention is to Solve

However, in an acid milk beverage where not only stability of product quality but also flavor are to be regarded as important, there have been some cases where specific viscous feeling inherent to said thickening stabilizer gives unfavorable texture in terms of flavor when a thickening stabilizer is used as having been done conventionally. Further, pectin and CMC which have been commonly and frequently used as thickening stabilizers have a property of becoming gel in a low pH region and their utilization to an acid milk beverage is not always an effective means.

Furthermore, in an acid milk beverage of the so-called light type in which calorie is suppressed, there is a tendency that the flavor of both reasonable sweet taste and refreshing texture is favored and, therefore, use of a thickening stabilizer or the like giving viscous feeling is not always preferred.

Accordingly, the problem that the invention is to solve is to provide an acid milk beverage of a light type where, without the use of conventionally used various kinds of thickening stabilizers, the product quality stability is excellent, flavor is good and calorie is suppressed and also to provide a process for producing the same.

Means for Solving the Problems

The present inventors have carried out intensive investigations for preparing a low-calorie acid milk beverage having an excellent product quality stability without the use of a thickening stabilizer and, as a result, they have found that, when polydextrose and a specific glucide are compounded with an acid milk beverage so as to satisfy the predetermined condition, it is now possible to prepare a good-flavored acid milk beverage having the same product quality stability as in the case of the use of a thickening stabilizer whereupon the invention has been achieved.

Thus, the invention relates to an acid milk beverage, characterized in that, the beverage contains polydextrose and at least one glucide selected from the group consisting of (a) glucose, fructose, sugar, trehalose, maltose, erythritol, sorbitol, xylitol, maltitol, lactitol, palatinose and galacto-oligosaccharide, wherein the total amount of those soluble solids is 12.0% by mass to 17.0% by mass and substantially no thickening stabilizer is contained therein.

The invention also relates to a process for producing an acid milk beverage, characterized in that, polydextrose and at least one glucide selected from the group (a) glucose, fructose, sugar, trehalose, maltose, erythritol, sorbitol, xylitol, maltitol, lactitol, palatinose and galacto-oligosaccharide are compounded with an acid milk beverage base so that the total amount of those soluble solids is made 12.0% by mass to 17.0% by mass.

Advantages of the Invention

Polydextrose and various glucides used in the invention are food materials which have been commonly used as sweeteners and, therefore, they are excellent in safety and, when they are used merely in such a manner of satisfying the predetermined condition, stability of milk protein under an acidic condition is able to be easily enhanced without the use of various thickening stabilizers which are apt to affect flavor and palatability whereby it is now possible to produce an acid milk beverage having an excellent product quality stability and a good flavor.

Thus, according to the present invention, various thickening stabilizers need not be used for the purpose of the product quality stability, whereby advantages such as reduction in the product cost and improvement in the working efficiency can be expected.

BEST MODES FOR CARRYING OUT THE INVENTION

Polydextrose to be compounded with the acid milk beverage of the invention is a polysaccharide produced by polymerization of glucose, sorbitol and citric acid at high temperature and under high pressure and is a mixture ranging from a monosaccharide to those where molecular weights are up to scores of thousands. Commercially available polydextrose is able to be used and that having a trade name "Litesse (trademark)" (manufactured by Danisco Cultor; average molecular weight: 1,200) may be exemplified.

The glucide compounded with the acid milk beverage of the invention together with the above polydextrose being selected from the group (a) (hereinafter, it may be referred to as "the glucide (a)") is at least one member selected from the group consisting of glucose, fructose, sugar, trehalose, lactose, erythritol, sorbitol, xylitol, maltitol, lactitol, palatinose and galacto-oligosaccharide and is a glucide having a relatively low (average) molecular weight among the glucides which are widely utilized for foods and drinks. Among the above, a significant effect for suppression of aggregation and precipitation of milk protein is available particularly by the use of sugar whereby such a use is preferred. When two or more glucides are used together as the glucide (a), the use of sugar as at least one of them is preferred in view of the product quality stability in the acid milk beverage.

When the molecular weight of the glucide used in the invention becomes relatively high, an effect of suppression of aggregation and precipitation of milk protein in the acid milk beverage is not sufficiently achieved. Thus, when the above polydextrose which is a polysaccharide is solely used in the invention, it is not possible to suppress precipitation and aggregation of milk protein in the acid milk beverage. Although the reason why the resulting effect is different depending upon the type of the glucide is not clear, it is likely that the difference in molecular structure of each glucide has a different steric influence on milk protein particles in the acid milk beverage.

In the invention, it is preferred to set the using amount of polydextrose and the glucide (a) at 12.0% by mass to 17.0% by mass or, preferably, 13.5% by mass to 17.0% by mass in terms of a soluble solid derived from the glucide. Particularly for the purpose of enhancing the product quality stability of the resulting acid milk beverage, it is preferred that the using amount of the glucide other than polydextrose or, in other words, the glucide (a) having a relatively low molecular weight is set at not less than 5.0% by mass or, preferably, not less than 6.0% by mass. As a result, it is possible to prepare an acid milk beverage having sufficient product quality stability and good flavor without substantial use of a thickening stabilizer. It is not preferred when the soluble solid is less than 12.0% by mass since a sufficient dispersion stability of milk protein can not be obtained. On the other hand, it is not preferred when the above is more than 17.0% by mass since the texture becomes poor and sufficient favorite taste can not be obtained.

With regard to an acid milk beverage base with which the above polydextrose and glucide (a) are compounded, there may be utilized liquid milk derived from animals and plants such as cow's milk, goat's milk, sheep's milk and soybean milk; skim milk, total milk powder or milk powder; fermented milk prepared by such a manner that milk reduced from concentrated milk either as it is or after diluting with water is subjected to a fermentation treatment using microbes such as lactic acid bacteria or bacteria of genus *Bifidobacterium*; beverage of a living microbe type such as milk product lactic acid bacteria beverage; milk-type beverage containing a fermented milk subjected to sterilization treatment; kefir; and a product which is made acidic by addition of an acid component such as organic acid or fruit juice to milk components.

With regard to the microbe used for the production of the acid milk beverage as mentioned above when it is conducted by means of microbial fermentation, there is no particular limitation for the microbe used for the production so far as it is lactic acid bacteria or bacteria belong to genus *Bifidobacterium* being commonly used for the manufacture of food and its examples are bacteria belonging to genus *Lactobacillus* such as *L. casei, L. acidophilus, L. helveticus, L. gasseri, L. fermentum, L. salivarius, L. yugulti, L. delbrueckii* subsp. *vulgaris* and *L. johnsonii*; bacteria belonging to genus *Streptococcus* such as *S. thermophilus*; bacteria belonging to genus *Lactococcus* such as *L. lactis* subsp. *lactis, L. lactis* subsp. *cremoris, L. plantalum* and *L. raffinolactis*; bacteria belonging to genus *Enterococcus* such as *E. faecalis* and *E. faecium*; and bacteria belonging to genus *Bifidobacterium* such as *B. breve, B. longum, B. infantis, B. adolescentis, B. bifidum, B. catenulatum, B. pseudocatenulatum, B. angulatum, B. lactis* and *B. animalis*. The lactic acid bacteria and bacteria belonging to genus *Bifidobacterium* as such may be used either solely or two or more thereof may be used in combination.

In the above microbial fermentation, it is also possible, in addition to the lactic acid bacteria and bacteria belonging to genus *Bifidobacterium*, to use other microbes such as yeasts of genus *Saccharomyces, Candida, Rhodotorula, Pichia, Schizosaccharomyces, Torula* and *Zygosaccharomyces*; and filamentous fungi of genus *Aspergillus, Penicillium, Eurotium, Monascus, Mucor, Neurospora* and *Rhyzopus*; etc. together therewith.

With regard to the conditions and the fermentation methods for acting the above microbes on the material milk, those which are conventionally used for the manufacture of fermented milk may be used and there is no particular limitation therefor. For example, with regard to the fermentation condition, fermentation may be conducted at the temperature of 30 to 40° C. until pH reaches 3.0 to 4.0 while, with regard to the fermentation method, a method selected from stationary fermentation, stirring fermentation, shaking fermentation, aerating fermentation, etc. suitable for the microbe used for the fermentation may be used.

In the invention, fermented milk prepared by a microbial fermentation in a stationary state is used whereby an effect of product quality stability can be significantly achieved even if substantially no stabilizer is used provided that polydextrose and the glucide (a) are used together as mentioned later.

On the other hand, an acid component may be added to a milk material and the pH is adjusted to 3.0 to 4.0 when the above acid milk beverage is produced using an acid component. Examples of the substance which is able to be used as an acid component are lactic acid, citric acid, tartaric acid, malic acid, acetic acid, etc. as well as fruit juice of lemon, grapefruit, lime, orange, strawberry, blueberry, peach, grape, apple, etc. Two or more thereof may be used in combination.

A water-soluble calcium source which is other than the calcium derived from milk materials may be also compounded with the acid milk beverage of the invention as an optional component. Examples of the water-soluble calcium source are calcium lactate, calcium gluconate, calcium chloride and calcium phosphate which are approved as food additives. Such a source is able to be used without any particular limitation. Amount of the calcium source as such in the acid milk beverage of the invention is about 0.01% by mass to 0.06% by mass or, preferably, 0.01% by mass to 0.05% by mass in terms of the amount of calcium.

It has been well known that, when a calcium source is compounded in an acid milk beverage, the added calcium source is usually aggregated with the milk protein and that is a cause of deterioration of quality of the product. In order to improve that, various proposals have been made already for a technique of compounding a calcium source with an acid milk beverage. Specific examples thereof are a method where pectin is used in an acid milk beverage containing calcium (JP-A-08-056567, JP-A-08-112058 and JP-A-08-112059) and a method where soybean diet fiber (soybean polysaccharide) is used therein (JP-A-10-004876 and JP-A-2004-283182).

However, in the prior art as such, deterioration of the product quality by addition of a calcium source in an acid milk beverage is prevented by compounding of a thickening stabilizer such as pectin or soybean dietary fiber so that aggregation of milk protein is positively prevented. This is clearly different from the acid milk beverage of the invention where, even when a calcium source is compounded, an excellent effect of the product quality stability can be achieved with the use of substantially no thickening stabilizer whereby the acid milk beverage of the invention is very useful as compared with the conventional art.

Production of the acid milk beverage of the invention may be carried out in accordance with the conventional process for the production of acid milk beverages except that the above-mentioned polydextrose, glucide (a) and, if necessary, a calcium source are compounded with an acid milk beverage which is a base. There is no particular limitation for the compounding time and compounding method of polydextrose, glucide (a) and calcium source but they may be added in any stage of the production process for an acid milk beverage which is a base. For example, a syrup containing predetermined amounts of polydextrose, glucide and a calcium source is prepared and is compounded with a solution prepared by the action of a microbe on a milk material. Preparation of the syrup may be carried out according to a conventional method. For example, polydextrose, glucide, etc. are dissolved in water heated at not lower than 70° C. and subjected to plate sterilization at 112° C. for 10 seconds.

Besides the above polydextrose, glucide (a) and calcium source, it is also possible to compound a food material which is usually compounded with various food/beverage within such an extent that the effect achieved by the invention is not deteriorated. Examples of the food material as such are a highly sweet sweetener such as aspartame, thaumatin, sucralose, acesulfame K and stevia; an emulsifier such as sugar fatty acid ester, glycerol fatty acid ester, polyglycerol fatty acid ester, sorbitan fatty acid ester and lecithin; milk fat such as cream, butter and sour cream; an acidulant such as citric acid, lactic acid, acetic acid, malic acid, tartaric acid and gluconic acid; vitamins such as vitamin A, vitamin B substances, vitamin C and vitamin E substances; minerals such as magnesium, zinc, iron and manganese; and flavor of yogurt type, berry type, orange type, Chinese quince type, perilla type, citrus type, apple type, mint type, grape type, apricot type, pear, custard cream, peach, melon, banana, tropical, herb type, black tea and coffee type.

In the acid milk beverage which is prepared as such, it is now possible to significantly prevent and improve the quality deterioration such as aggregation and precipitation of milk protein without the use of a thickening stabilizer such as pectin and soybean dietary fiber even when its calorie is reduced to an extent of, for example, not higher than 50 Kcal/100 ml or, preferably, from 20 Kcal/100 ml to 50 Kcal/100 ml.

EXAMPLES

The invention will now be illustrated in more detail by way of the following Test Examples and Examples although the invention is not restricted by those examples at all.

Test Example 1

Production of Acid Milk Beverages

An aqueous solution in which 14.9% by mass of skim milk and 3.5% by mass of glucose were dissolved was subjected to plate sterilization at 121° C. for 3 seconds and inoculated with a *Lactobacillus casei* starter and incubation was conducted until the pH reached 3.6 followed by cooling to give a fermented product. After that, the fermented product was homogenized at 15 MPa and 23 parts by weight thereof was mixed with 77 parts by weight of each of the syrups shown in Table 1 to give the test products 1 to 3. The syrups were prepared by dissolving the components shown in Table 1 in water, subjecting to plate sterilization at 112° C. for 10 seconds and cooling.

TABLE 1

|  | Syrup 1 | Syrup 2 | Syrup 3 |
| --- | --- | --- | --- |
| Polydextrose (PD) | 14.5 | 14.5 | 14.5 |
| Aspartame | 0.09 | 0.09 | 0.09 |
| Pectin | — | 0.4 | — |
| Carboxymethyl cellulose (CMC) | — | — | 0.4 |

Amount of the PD used was calculated on the basis of solid; the unit is in % by mass.

Appearance, precipitation, separation of whey and flavor of the test products 1 to 3 immediately after manufacture and also after storing at 10° C. for 14 days were evaluated respectively, according to the following criteria. The result is shown in Table 2.

<Criteria for Judging the Appearance>

| (Evaluation) | (Content) |
| --- | --- |
| ○: | no aggregation, etc. |
| Δ: | some aggregation |
| x: | notable aggregation |

<Criteria for Judging the Precipitation and the Whey-Off>

| (Evaluation) | (Content) |
| --- | --- |
| −: | no precipitation |
| ±: | slight precipitation but no significant problem |
| +: | notable precipitation |

<Criteria for Judging the Flavor>

| (Evaluation) | (Content) |
| --- | --- |
| ○: | good |
| ○Δ: | fair |
| Δ: | normal |
| Δx: | poor |
| x: | bad |

TABLE 2

|  |  | Test Product 1 | Test Product 2 | Test Product 3 |
|---|---|---|---|---|
| Syrup | | 1 | 2 | 3 |
| Amounts per Product (% by mass) | PD | 11.2 | 11.2 | 11.2 |
| | Glucose (derived from fermented product) | 0.8 | 0.8 | 0.8 |
| | Aspartame | 0.07 | 0.07 | 0.07 |
| | Pectin | — | 0.3 | — |
| | CMC | — | — | 0.5 |
| Soluble Solid derived from Glucide * | | 12.0% | 12.0% | 12.0% |
| Calorie Values (Kcal/100 ml) | | 28.6 | 29.0 | 30.7 |
| Immediately after Manufacture | pH | 3.64 | 3.64 | 3.64 |
| | Appearance | x | ○ | ○ |
| | Flavor | x | Δx | Δx |
| After Storing at 10° C. for 14 Days | Precipitation/Separation of Whey | + | − to ± | − to ± |
| | Appearance | x | ○ | ○ |
| | Flavor | x | Δx to x | Δx to x |

* excluding the soluble solid derived from the skim milk

It will be apparent from the result of Table 2 that, in the test product 1 where only polydextrose (PD) was contained, both flavor and properties were bad and, in the test products 2 and 3 where a thickening stabilizer such as pectin or carboxymethyl cellulose (CMC) was compounded, although an improving effect to properties was noted, texture (palatability and feel on the tongue) tended to be bad.

Example 1

Production of Acid Milk Beverages (1)

An aqueous solution in which 14.9% by mass of skim milk and 3.5% by mass of glucose were dissolved was subjected to plate sterilization at 121° C. for 3 seconds and inoculated with a *Lactobacillus casei* starter and incubation was conducted until the pH reached 3.6 followed by cooling to give a fermented product. After that, the fermented product was homogenized at 15 MPa and 23 parts by weight thereof was mixed with 77 parts by weight of each of the syrups which were prepared separately to give the products 1 to 12 of the invention and the comparative products 1 and 2. The syrups were prepared by dissolving the components shown in Table 3 in water, subjecting to plate sterilization at 112° C. for 10 seconds and cooling.

TABLE 3

|  | A | B | C | D | E | F | G | H | I | J | K | L | M | N |
|---|---|---|---|---|---|---|---|---|---|---|---|---|---|---|
| PD | 9.1 | 9.1 | 9.1 | 9.1 | 9.1 | 9.1 | 9.1 | 9.1 | 9.1 | 9.1 | 9.1 | 9.1 | 9.1 | — |
| Glucose | 5.5 | — | — | — | — | — | — | — | — | — | — | — | — | — |
| Fructose | — | 5.5 | — | — | — | — | — | — | — | — | — | — | — | — |
| Sugar | — | — | 5.5 | — | — | — | — | — | — | — | — | — | — | — |
| Trehalose | — | — | — | 5.5 | — | — | — | — | — | — | — | — | — | — |
| Maltose | — | — | — | — | 5.5 | — | — | — | — | — | — | — | — | — |
| Erythritol | — | — | — | — | — | 5.5 | — | — | — | — | — | — | — | — |
| Sorbitol | — | — | — | — | — | — | 5.5 | — | — | — | — | — | — | — |
| Xylitol | — | — | — | — | — | — | — | 5.5 | — | — | — | — | — | — |
| Maltitol | — | — | — | — | — | — | — | — | 5.5 | — | — | — | — | — |
| Lactitol | — | — | — | — | — | — | — | — | — | 5.5 | — | — | — | — |
| Palatinose | — | — | — | — | — | — | — | — | — | — | 5.5 | — | — | — |
| Galacto-oligo-saccharide | — | — | — | — | — | — | — | — | — | — | — | 5.5 | — | — |
| Pectin | — | — | — | — | — | — | — | — | — | — | — | — | 0.4 | — |
| Hardly-digestible Dextrin | — | — | — | — | — | — | — | — | — | — | — | — | — | 14.5 |
| Aspartame | 0.06 | 0.04 | 0.05 | 0.06 | 0.08 | 0.05 | 0.06 | 0.05 | 0.06 | 0.08 | 0.08 | 0.08 | 0.05 | 0.05 |

Amounts of PD and other glucides were calculated on the basis of solids; unit was % by mass.

Appearance, precipitation, separation of whey and flavor of the products 1 to 12 of the invention and the comparative products 4 and 5 immediately after manufacture and after storing at 10° C. for 14 days were evaluated respectively, according to the criteria mentioned in Test Example 1. The result is shown in Table 4.

TABLE 4

|  |  | PI 1 | PI 2 | PI 3 | PI 4 | PI 5 | PI 6 | PI 7 | PI 8 | PI 9 | PI 10 | PI 11 | PI 12 | CP 1 | CP 2 |
|---|---|---|---|---|---|---|---|---|---|---|---|---|---|---|---|
| Syrup | | A | B | C | D | E | F | G | H | I | J | K | L | M | N |
| Amounts per Product (unit: % by | PD | 7.0 | 7.0 | 7.0 | 7.0 | 7.0 | 7.0 | 7.0 | 7.0 | 7.0 | 7.0 | 7.0 | 7.0 | 7.0 | — |
| | Glucose[1]* | 5.0 | 0.8 | 0.8 | 0.8 | 0.8 | 0.8 | 0.8 | 0.8 | 0.8 | 0.8 | 0.8 | 0.8 | 0.8 | 0.8 |
| | Fructose | — | 4.2 | — | — | — | — | — | — | — | — | — | — | — | — |

TABLE 4-continued

|  |  | PI 1 | PI 2 | PI 3 | PI 4 | PI 5 | PI 6 | PI 7 | PI 8 | PI 9 | PI 10 | PI 11 | PI 12 | CP 1 | CP 2 |
|---|---|---|---|---|---|---|---|---|---|---|---|---|---|---|---|
| mass) | Sugar | — | — | 4.2 | — | — | — | — | — | — | — | — | — | 5.0 | — |
|  | Trehalose | — | — | — | 4.2 | — | — | — | — | — | — | — | — | — | — |
|  | Maltose | — | — | — | — | 4.2 | — | — | — | — | — | — | — | — | — |
|  | Erythritol | — | — | — | — | — | 4.2 | — | — | — | — | — | — | — | — |
|  | Sorbitol | — | — | — | — | — | — | 4.2 | — | — | — | — | — | — | — |
|  | Xylitol | — | — | — | — | — | — | — | 4.2 | — | — | — | — | — | — |
|  | Maltitol | — | — | — | — | — | — | — | — | 4.2 | — | — | — | — | — |
|  | Lactitol | — | — | — | — | — | — | — | — | — | 4.2 | — | — | — | — |
|  | Palatinose | — | — | — | — | — | — | — | — | — | — | 4.2 | — | — | — |
|  | Galacto-oligo-saccharide | — | — | — | — | — | — | — | — | — | — | — | 4.2 | — | — |
|  | Pectin | — | — | — | — | — | — | — | — | — | — | — | — | 0.3 | — |
|  | Hardly-digestible Dextrin | — | — | — | — | — | — | — | — | — | — | — | — | — | 11.2 |
|  | Aspartame | 0.05 | 0.04 | 0.05 | 0.06 | 0.06 | 0.05 | 0.05 | 0.05 | 0.05 | 0.06 | 0.06 | 0.06 | 0.05 | 0.06 |
| Soluble Solid[2]* |  | 12.0 | 12.0 | 12.0 | 12.0 | 12.0 | 12.0 | 12.0 | 12.0 | 12.0 | 12.0 | 12.0 | 12.0 | 12.0 | 12.0 |
| Calorie Value (Kcal/100 ml) |  | 41.8 | 41.8 | 41.8 | 41.8 | 41.8 | 24.0 | 37.4 | 37.4 | 32.9 | 32.9 | 41.9 | 37.0 | 49.0 | 28.5 |
| Immediately after manufacture | pH | 3.64 | 3.64 | 3.64 | 3.65 | 3.64 | 3.65 | 3.65 | 3.64 | 3.63 | 3.64 | 3.64 | 3.65 | 3.65 | 3.66 |
|  | Appearance | ○ | ○ | ○ | ○ | ○ | ○ | ○ | ○ | ○ | ○ | ○ | ○ | ○ | ○ |
|  | Flavor | ○ to ○Δ | ○ to ○Δ | ○ | ○Δ | ○Δ | ○ to ○Δ | ○ to ○Δ | ○ to ○Δ | ○ to ○Δ | ○Δ | ○Δ | ○Δ | Δx | Δ |
| After storing at 10° C. for 14 days | Precipitation/Separation of Whey | − to ± | − to ± | − to ± | − to ± | − to ± | ± | ± | ± | ± | ± | ± | ± | − to ± | − to + |
|  | Appearance | ○ | ○ | ○ | ○ | ○ | ○ | ○ | ○ | ○ | ○ | ○ | ○ | ○ | ○ |
|  | Flavor | ○ to ○Δ | ○ to ○Δ | ○ | ○Δ | ○Δ | ○ to ○Δ | ○ to ○Δ | ○ to ○Δ | ○ to ○Δ | ○Δ | ○Δ | ○Δ | Δx to x | Δ |

PI: Product of the Invention
CP: Comparative Product
(unit: % by mass)
[1]*containing that derived from fermented product
[2]*excluding the soluble solid derived from the skim milk It is apparent from the result of Table 4 that, in the acid milk beverages prepared by the combined use of polydextrose (PD) and various glucides, the same product quality stabilization effect as in the case of Comparative Product 1 where pectin was used as a thickening stabilizer was obtained and the flavor was also good. In the Comparative Product 2 where a hardly-digestible dextrin was used as a polysaccharide, the same product quality stabilization effect as in the use of polydextrose was not obtained even when glucides are used together. Among the glucides used in combination with polydextrose, sugar was found to be most useful.

Example 2

Production of Acid Milk Beverages (2)

An aqueous solution in which 14.9% by mass of skim milk and 3.5% by mass of glucose were dissolved was subjected to plate sterilization at 121° C. for 3 seconds and inoculated with a *Lactobacillus casei* starter and incubation was conducted until the pH reached 3.6 followed by cooling to give a fermented product. After that, the fermented product was homogenized at 15 MPa and 23 parts by weight thereof was mixed with 77 parts by weight of each of the syrups which were prepared separately in the compositions shown in Table 5 to give the products 1 to 6. The syrups were prepared by dissolving the components in water, subjecting to plate sterilization at 112° C. for 10 seconds and cooling.

TABLE 5

|  | Syrup | | | | | |
|---|---|---|---|---|---|---|
|  | a | b | c | d | e | f |
| PD | 11.6 | 10.4 | 9.1 | 7.8 | 6.5 | 9.1 |
| Aspartame | 0.06 | 0.06 | 0.05 | 0.05 | 0.05 | — |
| Sugar | 2.9 | 4.2 | 5.5 | 6.8 | 8.1 | 5.5 |

Amounts of PD and other glucides were calculated on the basis of solids; the unit was % by mass.

Appearance, precipitation, separation of whey and flavor of the products 1 to 6 immediately after manufacture and after storing at 10° C. for 14 days were evaluated respectively, according to the criteria mentioned in Test Example 1. The result is shown in Table 6.

TABLE 6

|  |  | Product 1 | Product 2 | Product 3 | Product 4 | Product 5 | Product 6 |
|---|---|---|---|---|---|---|---|
| Syrup |  | a | b | c | d | e | f |
| Amounts per Product (% by mass) | PD | 9.0 | 8.0 | 7.0 | 6.0 | 5.0 | 7.0 |
|  | Sugar | 2.2 | 3.2 | 4.2 | 5.2 | 6.2 | 4.2 |
|  | Glucose*[1] | 0.8 | 0.8 | 0.8 | 0.8 | 0.8 | 0.8 |
|  | Aspartame | 0.05 | 0.05 | 0.04 | 0.04 | 0.04 | — |

TABLE 6-continued

|  |  | Product 1 | Product 2 | Product 3 | Product 4 | Product 5 | Product 6 |
|---|---|---|---|---|---|---|---|
| Soluble Solid*2 |  | 12.0 | 12.0 | 12.0 | 12.0 | 12.0 | 12.0 |
| Calorie Values (Kcal/100 ml) |  | 35.5 | 38.7 | 41.8 | 45.0 | 48.2 | 41.6 |
| Immediately after Manufacture | pH | 3.66 | 3.66 | 3.67 | 3.67 | 3.67 | 3.66 |
|  | Appearance | ○ | ○ | ○ | ○ | ○ | ○ |
|  | Flavor | ○ to ○Δ | ○ to ○Δ | ○ | ○ | ○ | x |
| After Storing at 10° C. for 14 Days | Precipitation/Separation of Whey | ± | ± | − to ± | − | − | − to ± |
|  | Appearance | Δ | ○ | ○ | ○ | ○ | ○ |
|  | Flavor | ○ to ○Δ | ○ to ○Δ | ○ | ○ | ○ | x |

*1containing that derived from fermented product
*2excluding the soluble solid derived from the skim milk It is apparent from the result of Table 6 that, in the acid milk beverages prepared by the combined use of polydextrose and various glucides, there was a tendency that, as compared with the products 3 to 6 where the soluble solid derived from the glucides except polydextrose was not less than 5.0% by mass, much precipitation and separation of whey were noted and stability was inferior when said soluble solid was less than 5.0% by mass as in the case of the products 1 and 2 even if the soluble solid derived from the glucides therein was in the same amount. In the product 6 where no highly sweet sweetener was used, acidity and sweetness were unbalanced and the flavor was inferior.

Example 3

Production of Acid Milk Beverages (3)

An aqueous solution in which 14.9% by mass of skim milk and 3.5% by mass of glucose were dissolved was subjected to plate sterilization at 121° C. for 3 seconds and inoculated with a *Lactobacillus casei* starter and incubation was conducted until the pH reached 3.6 followed by cooling to give a fermented product. After that, the fermented product was homogenized at 15 MPa and 23 parts by weight thereof was mixed with 77 parts by weight of each of the syrups which were prepared according to the compositions of Table 7 separately to give the products 7 to 14 where the amounts of the soluble solid were different. The syrups were prepared by dissolving the components in water, subjecting to plate sterilization at 112° C. for 10 seconds and cooling.

TABLE 7

|  | Syrup | | | | | | | |
|---|---|---|---|---|---|---|---|---|
|  | g | h | i | j | k | l | m | n |
| PD | 6.5 | 7.8 | 9.1 | 11.0 | 13.6 | 15.6 | 16.9 | 18.2 |
| Aspartame | 0.06 | 0.06 | 0.06 | 0.06 | 0.06 | 0.06 | 0.06 | 0.06 |
| Sugar | 5.5 | 5.5 | 5.5 | 5.5 | 5.5 | 5.5 | 5.5 | 5.5 |

Amounts of PD and other glucides were calculated on the basis of solids; unit was % by mass.

Appearance, precipitation, separation of whey and flavor of the products 1 to 8 immediately after manufacture and after storing at 10° C. for 14 days were evaluated respectively, according to the criteria mentioned in Test Example 1. The result is shown in Table 8.

TABLE 8

|  |  | Product 7 | Product 8 | Product 9 | Product 10 | Product 11 | Product 12 | Product 13 | Product 14 |
|---|---|---|---|---|---|---|---|---|---|
| Syrup |  | g | h | i | j | k | l | m | n |
| Amounts per Product (% by mass) | PD | 5.0 | 6.0 | 7.0 | 8.5 | 10.5 | 12.0 | 13.0 | 14.0 |
|  | Sugar | 4.2 | 4.2 | 4.2 | 4.2 | 4.2 | 4.2 | 4.2 | 4.2 |
|  | Glucose*1 | 0.8 | 0.8 | 0.8 | 0.8 | 0.8 | 0.8 | 0.8 | 0.8 |
|  | Aspartame | 0.05 | 0.05 | 0.05 | 0.05 | 0.05 | 0.05 | 0.05 | 0.05 |
| Soluble Solid*2 |  | 10.0 | 11.0 | 12.0 | 13.5 | 15.5 | 17.0 | 18.0 | 19.0 |
| Calorie Values (Kcal/100 ml) |  | 39.7 | 40.8 | 41.8 | 43.4 | 45.6 | 47.1 | 48.2 | 49.3 |
| Immediately after Manufacture | pH | 3.66 | 3.67 | 3.67 | 3.67 | 3.67 | 3.67 | 3.67 | 3.67 |
|  | Appearance | Δ | ○ | ○ | ○ | ○ | ○ | ○ | ○ |
|  | Flavor | ○Δ | ○ to ○Δ | ○ | ○ | ○ | ○ | ○ to ○Δ | ○Δ |
| After Storing at 10° C. for 14 Days | Precipitation/Separation of Whey | + | ± | − to ± | − | − | − | − | − |
|  | Appearance | Δ | Δ | ○ | ○ | ○ | ○ | ○ | ○ |
|  | Flavor | ○ to ○Δ | ○ to ○Δ | ○ | ○ | ○ | ○ | ○ to ○Δ | ○Δ |

*1containing that derived from fermented product
*2excluding the soluble solid derived from the skim milk It is apparent from the result of Table 8 that, in the acid milk beverages prepared by the combined use of polydextrose and various glucides, there was a tendency of much precipitation and separation of whey and stability was inferior when the total amount of the soluble solid derived from the glucides except polydextrose was less than 12.0% by mass as in the case of the products 7 and 8 even if the soluble solid derived from the glucides except polydextrose therein was in the same amount. There was also a tendency that, when the total amount of the soluble solid is not less than 18.0% by mass as in the case of the products 13 and 14, although there is no problem in terms of the product quality stability, feeling upon drinking is heavy resulting in a flavor being different from the image of a low-calorie product whereby the palate was inferior.

Example 4

Production of Acid Milk Beverages (4)

An aqueous solution in which 14.9% by mass of skim milk and 3.5% by mass of glucose were dissolved was subjected to plate sterilization at 121° C. for 3 seconds and inoculated with a *Lactobacillus casei* starter and incubation was conducted until the pH reached 3.6 followed by cooling to give a fermented product. After that, the fermented product was homogenized (15 MPa) and 23 parts by weight thereof was mixed with 77 parts by weight of each of the syrups which were prepared according to the compositions of Table 7 separately to give the products 15 to 23 where the amounts of the soluble solid were different. The syrups were prepared by dissolving the components in water, subjecting to plate sterilization at 112° C. for 10 seconds and cooling.

TABLE 9

| | Syrup | | | | | | | | |
|---|---|---|---|---|---|---|---|---|---|
| | I | II | III | IV | V | VI | VII | VIII | IX |
| PD | 11.7 | 11.7 | 11.7 | 9.1 | 9.1 | 9.1 | 6.5 | 6.5 | 6.5 |
| Aspartame | 0.08 | 0.08 | 0.08 | 0.06 | 0.06 | 0.06 | 0.04 | 0.04 | 0.04 |
| Sugar | 2.9 | 2.9 | 2.9 | 5.5 | 5.5 | 5.5 | 8.1 | 8.1 | 8.1 |
| Calcium lactate | 0.00 | 0.56 | 0.93 | 0.00 | 0.56 | 0.93 | 0.00 | 0.56 | 0.93 |

Amounts of PD and other glucides were calculated on the basis of solids; unit was % by mass.

Appearance, precipitation, separation of whey and flavor of the products 1 to 8 being immediately after manufacture and also after storing at 10° C. for 14 days were evaluated according to the criteria mentioned in Test Example 1. The result is shown in Table 8.

of the products 15 to 17 even if the total amount of the soluble solid derived from the glucides except polydextrose therein was in the same amount while, when the soluble solid derived from the glucides except polydextrose was not less than 5.0% by mass as in the case of the products 18 to 23, lowering in stability by addition of calcium was suppressed and, further, if the added amount of calcium was by 0.06% by mass, commercial value was not deteriorated even after the storage.

INDUSTRIAL APPLICABILITY

In the acid milk beverage of the invention, polydextrose and specific glucides are contained therein for satisfying the predetermined conditions whereupon it is now possible to easily produce an acid milk beverage of a low-calorie type having a good flavor even when various thickening stabilizers which are usually used for achieving the stabilization of product quality of an acid milk beverage are not substantially contained.

The invention claimed is:

1. A stabilized acid milk beverage comprising:
an acid milk base,
a water-soluble calcium salt other than calcium present in milk materials used to make the beverage, in an amount ranging from 0.01% to 0.1%,
polydextrose, and
at least one non-polydextrose glucide selected from the group consisting of glucose, fructose, sucrose, trehalose, maltose, erythritol, sorbitol, xylitol, maltitol, lactitol, and palatinose in an amount of not less than 5%,
wherein the total amount of said polydextrose and at least one glucide as soluble solids is 12.0% by mass to 17.0% by mass,
wherein said acid milk beverage contains substantially no thickening stabilizer,
wherein said acid milk beverage contains no more than 50 kcal/100 ml, and
wherein said stabilized acid milk beverage has reduced precipitation or whey-off after storage for 14 days at 10°

TABLE 10

| | | Product 15 | Product 16 | Product 17 | Product 18 | Product 19 | Product 20 | Product 21 | Product 22 | Product 23 |
|---|---|---|---|---|---|---|---|---|---|---|
| Syrup | | I | II | III | IV | V | VI | VII | VIII | IX |
| Amounts per Product | PD | 9.0 | 9.0 | 9.0 | 7.0 | 7.0 | 7.0 | 5.0 | 5.0 | 5.0 |
| | Sugar | 2.2 | 2.2 | 2.2 | 4.2 | 4.2 | 4.2 | 6.2 | 6.2 | 6.2 |
| | Glucose*[1] | 0.8 | 0.8 | 0.8 | 0.8 | 0.8 | 0.8 | 0.8 | 0.8 | 0.8 |
| | Aspartame | 0.06 | 0.06 | 0.06 | 0.05 | 0.05 | 0.05 | 0.03 | 0.03 | 0.03 |
| | Calcium | 0 | 0.06 | 0.10 | 0 | 0.06 | 0.10 | 0 | 0.06 | 0.10 |
| Soluble Solid*[2] | | 12.0 | 12.0 | 12.0 | 12.0 | 12.0 | 12.0 | 12.0 | 12.0 | 12.0 |
| Calorie Values (Kcal/100 ml) | | 35.5 | 35.5 | 35.5 | 41.8 | 41.8 | 41.8 | 48.1 | 48.1 | 48.1 |
| Immediately after Manufacture | pH | 3.66 | 3.68 | 3.70 | 3.66 | 3.68 | 3.70 | 3.66 | 3.68 | 3.70 |
| | Appearance | Δ | Δ | x | ○ | ○ | Δ | ○ | ○ | ○ |
| After Stored at 10° C. for 14 Days | Precipitation/ Separation of Whey | ± | + | + | − | ± | + | − | − | ± |
| | Appearance | Δ | x | x | ○ | Δ | x | ○ | ○ | ○ |

*[1]containing that derived from fermented product
*[2]excluding the soluble solid derived from the skim milk It is apparent from the result of Table 8 that, in the acid milk beverages prepared by the combined use of polydextrose (PD) and various glucides, there was a tendency that stability was significantly deteriorated by addition of water-soluble calcium when the soluble solid derived from the glucides except polydextrose was less than 5.0% by mass as in the case C. compared to an otherwise identical acid milk beverage that does not contain 12% by mass to 17.0% by mass of said polydextrose and at least one glucide selected from the group consisting of glucose, fructose, sucrose, trehalose, maltose, erythritol, sorbitol, xylitol, maltitol, lactitol, and palatinose.

2. The acid milk beverage according to claim 1, wherein the beverage contains the at least one glucide in an amount 6% by mass.

3. The acid milk beverage according to claim 1, wherein the content of said water-soluble calcium salt other than the calcium derived from a milk material ranges from 0.01% by mass to 0.06% by mass.

4. The acid milk beverage according to claim 1, wherein the content of said water-soluble calcium salt other than the calcium derived from a milk material ranges from 0.01% by mass to 0.05% by mass.

5. A process for producing the stabilized acid milk beverage of claim 1 comprising:
compounding polydextrose and at least one glucide selected from the group consisting of glucose, fructose, sucrose, trehalose, maltose, erythritol, sorbitol, xylitol, maltitol, lactitol, and palatinose with an acid milk beverage base so that the total amount of those soluble solids is made 12.0% by mass to 17.0% by mass.

6. The process for producing the acid milk beverage according to claim 5, wherein the at least one glucide is compounded in an amount of not less than 5.0% by mass.

7. The stabilized acid milk beverage of claim 1 that does not contain pectin, carboxymethyl cellulose (CMC), soybean polysaccharide, gellan gum, locust bean gum, tamarind gum, or propylene glycol alginate.

8. The stabilized acid milk beverage of claim 1 that contains not less than 5.0% by mass of said at least one glucide and not more than 7.0 to 12.0% by mass of polydextrose.

9. The stabilized acid milk beverage of claim 1 that contains not less than 6.0% by mass of said at least one glucide and not more than 6.0 to 11.0% by mass of polydextrose.

10. The stabilized acid milk beverage of claim 1, wherein said at least one glucide selected from the group consisting of glucose and fructose.

11. The stabilized acid milk beverage of claim 1, wherein said at least one glucide is selected from the group consisting of sugar (sucrose), maltose, trehalose, and palitinose.

12. The stabilized acid milk beverage of claim 1, wherein said at least one glucide selected from the group consisting of erythritol, sorbitol, xylitol, maltitol, and lactitol.

13. The stabilized acid milk beverage of claim 1, wherein the water soluble calcium salt is selected from at least one of calcium lactate, calcium gluconate, calcium chloride and calcium phosphate.

14. The stabilized acid milk beverage of claim 1 that is a non-yogurt beverage fermented with *Lactobacillus casei* or *Bifidobacterium*.

15. A method for stabilizing an acidic milk drink that contains no more than 50 kcal/ml without the use of a thickening stabilizer comprising:
incorporating 12% by mass to 17.0% by mass of a mixture of polydextrose and at least one glucide selected from the group consisting of glucose, fructose, sucrose, trehalose, maltose, erythritol, sorbitol, xylitol, maltitol, lactitol, and palatinose into an acidic milk drink base;
wherein said acidic milk drink contains a water-soluble calcium salt, other than calcium present in milk materials used to make the beverage, in an amount ranging from 0.01% to 0.1%.

16. The method of claim 15, wherein the acidic milk drink has a pH ranging from 3.0 to 4.0.

17. The method of claim 15, wherein the acidic milk drink base consists essentially of unsweetened fermented milk.

18. The method of claim 15, wherein the acidic milk drink base consists essentially of unsweetened acidified milk.

19. The method of claim 15, wherein the water soluble calcium salt is selected from at least one of calcium lactate, calcium gluconate, calcium chloride and calcium phosphate.

20. A stabilized milk beverage containing no more than 50 kcal/100 ml having an acidic pH comprising:
fermented or acidified milk having a pH ranging from 3.0 to 4.0;
a water-soluble calcium source, other than calcium present in milk materials used to make the beverage, in an amount ranging from 0.01% to 0.1%; and
polydextrose and glucide (a) in an amount ranging from 12.0% by mass to 17.0% by mass in terms of a soluble solid derived from the glucide and excluding soluble solid derived from milk, wherein glucide (a) is at least one selected from the group consisting of glucose, fructose, sucrose, trehalose, maltose, erythritol, sorbitol, xylitol, maltitol, lactitol, and palatinose;
wherein said stabilized milk beverage contains substantially no pectin, soybean dietary fiber, or carboxy methyl cellulose (CMC); and
wherein said stabilized acid milk beverage has reduced precipitation or whey-off after storage for 14 days at 10° C. compared to an otherwise identical acid milk beverage that does not contain 12% by mass to 17.0% by mass of the polydextrose and at least one glucide selected from the group consisting of glucose, fructose, sucrose, trehalose, maltose, erythritol, sorbitol, xylitol, maltitol, lactitol, and palatinose.

21. The stabilized acid milk beverage of claim 20 which contains the at least one glucide in an amount not less than 5% by mass in terms of soluble solid derived from said glucide.

22. The stabilized acid milk beverage of claim 20, wherein the water soluble calcium source is selected from at least one of calcium lactate, calcium gluconate, calcium chloride and calcium phosphate.

23. The stabilized acid milk beverage of claim 20 that is a non-yogurt beverage fermented with *Lactobacillus casei* or *Bifidobacterium*.

* * * * *